(12) United States Patent
Jenne et al.

(10) Patent No.: US 10,037,066 B2
(45) Date of Patent: Jul. 31, 2018

(54) POWER SUPPLY UNIT MISMATCH DETECTION SYSTEM

(71) Applicant: Dell Products L.P., Round Rock, TX (US)

(72) Inventors: John Jenne, Austin, TX (US); Craig Klein, Elgin, TX (US)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 15/093,312

(22) Filed: Apr. 7, 2016

(65) Prior Publication Data
US 2017/0293341 A1 Oct. 12, 2017

(51) Int. Cl.
G06F 1/32 (2006.01)
G06F 1/26 (2006.01)

(52) U.S. Cl.
CPC .................. G06F 1/3206 (2013.01)

(58) Field of Classification Search
None
See application file for complete search history.

(56) References Cited

U.S. PATENT DOCUMENTS

| | | | | |
|---|---|---|---|---|
| 2005/0248889 | A1* | 11/2005 | Chen | G06F 1/263 361/18 |
| 2009/0254768 | A1* | 10/2009 | Livescu | G06F 1/3203 713/320 |
| 2010/0038963 | A1* | 2/2010 | Shetty | G06F 11/3062 307/62 |
| 2011/0191618 | A1* | 8/2011 | Berke | G06F 1/28 713/340 |
| 2013/0106190 | A1* | 5/2013 | Lin | H02J 9/061 307/64 |
| 2014/0225438 | A1* | 8/2014 | Eguchi | G06F 1/26 307/23 |
| 2015/0006943 | A1* | 1/2015 | Suzuki | G06F 1/263 713/340 |
| 2015/0082055 | A1* | 3/2015 | Grout | G06F 1/26 713/300 |
| 2016/0282892 | A1* | 9/2016 | Saavedra | G05F 1/66 |

* cited by examiner

*Primary Examiner* — Kim Huynh
*Assistant Examiner* — Danny Chan
(74) *Attorney, Agent, or Firm* — Haynes and Boone, LLP

(57) ABSTRACT

A power supply unit (PSU) mismatch detection system that includes a plurality of PSU slots configured to couple to a PSU and transmit power to an auxiliary power rail (APR) and a main power rail (MPR), a controller that is coupled to the MPR and the PSU slots and configured to perform a PSU mismatch check on each PSU coupled to the PSU slots, and a programmable logic device (PLD) that is coupled to the APR, the MPR, and each of the plurality of PSU slots. The PLD enables transmission of power to the MPR from a first PSU coupled to a first PSU slot, receives an indication that the controller has completed the PSU mismatch check, determines valid PSU slots using the results of the PSU mismatch check, and enables the transmission of power to the main power rail from the valid PSUs slots.

20 Claims, 4 Drawing Sheets

| | |
|---|---|
| POWER ON REQ | True/False |
| CONTROLLER PSU MM CHECK COMPLETE | True/False |

| | PSU Slot(1) | PSU Slot(2) | PSU Slot(3) | PSU Slot(N) |
|---|---|---|---|---|
| PSU SLOT AC OK | True/False | True/False | True/False | True/False |
| PSU SLOT PLD ENABLED | True/False | True/False | True/False | True/False |
| PSU SLOT OP OK | True/False | True/False | True/False | True/False |
| PSU SLOT CONTROLLER ENABLED | True/False | True/False | True/False | True/False |

FIG. 4

POWER SUPPLY UNIT MISMATCH DETECTION SYSTEM

BACKGROUND

The present disclosure relates generally to information handling systems, and more particularly to a Power Supply Unit (PSU) mismatch detection system in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Customization of information handling systems for various uses is ever increasing, which drives a complete spectrum of power requirements into the design of power supplies for information handling systems. One result of allowing for customization is that a variety of power supplies might be physically capable of connecting to a particular system, and those power supplies may have differing features that can result in incompatibility. This incompatibility may cause issues such as, for example, unstable power delivery, power supply shutdown, or even system damage depending on the system and the incompatibility. One solution of preventing mismatch between power supplies is providing a physical lock out mechanism such that only particular power supplies may be connected to power supply slots on the system. While this solution prevents power supplies that are incompatible with the system from being used with the system, it does not address the issue of power supplies that are incompatible with each other but that are each compatible with the system and it does not address different generations of PSUs that are mechanically identical. In some situations, PSU mismatch algorithms are used to detect incompatible power supplies before enabling main power to those power supplies. However, those PSU mismatch algorithms are performed by a controlling entity such as a Baseboard Management Controller (BMC) that is powered by an auxiliary power rail. Booting the system and performing the PSU mismatch using the BMC is a relatively slow process that extends the time required for main power enablement by as much as several minutes.

Accordingly, it would be desirable to provide an improved PSU mismatch detection system.

SUMMARY

According to one embodiment, an Information Handling System (IHS) includes a chassis; a processing system located in the chassis; a memory system located in the chassis and coupled to the processing system; and a power system located in the chassis and coupled to each of the processing system and the memory system, wherein the power system includes: a plurality of PSU slots, wherein each PSU slot is configured to couple to a PSU and transmit power from that PSU to an auxiliary power rail and a main power rail; a controller that is coupled to the main power rail and each of the plurality of PSU slots, wherein the controller is configured to perform a PSU mismatch check on each PSU coupled to the plurality of PSU slots when the main power rail is enabled, and report results of the PSU mismatch check; and a programmable logic device that is coupled to the auxiliary power rail, the main power rail, and each of the plurality of PSU slots, wherein the programmable logic device is configured to: receive a request to enable the main power rail; enable transmission of power to the main power rail from a first PSU coupled to a first PSU slot of the plurality of PSU slots; determine that the power transmitted to the main power rail from the first PSU coupled to the first PSU slot is within a threshold; receive an indication that the controller has completed the PSU mismatch check on each PSU coupled to the plurality of PSU slots, wherein the controller performs the PSU mismatch check using power transmitted to the main power rail through the first PSU slot by the first PSU; determine one or more valid PSU slots from the plurality of PSU slots that are coupled to a PSU belonging to a valid PSU configuration using the results of the PSU mismatch check; and enable the transmission of power to the main power rail from the one or more PSUs belonging to the valid PSU configuration coupled to the one or more valid PSUs slots.

BRIEF DESCRIPTION OF THE DRAWINGS

FIG. 4 is a table illustrating an embodiment of a data structure for PSU management that is stored in a memory of the PSU mismatch detection system of FIG. 2.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
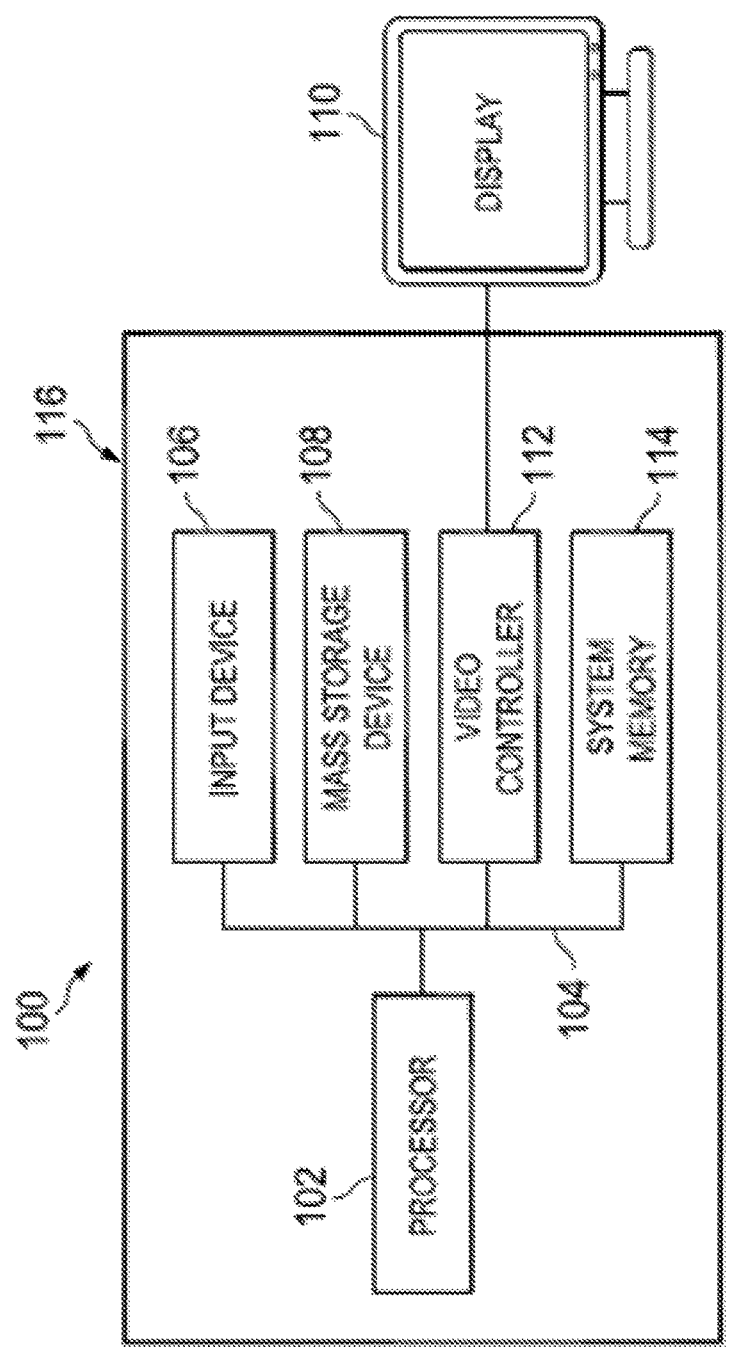
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
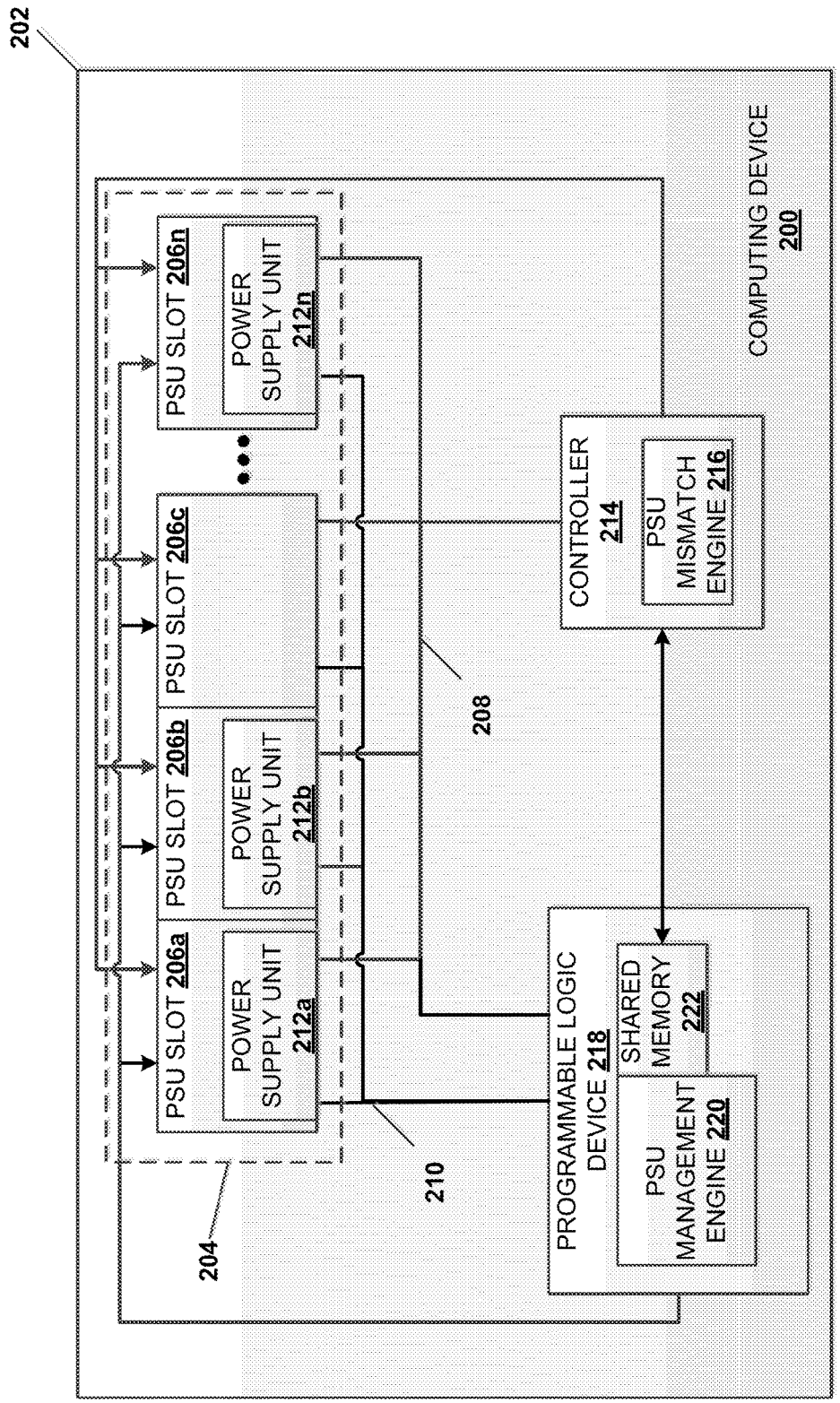
FIG. 2 is a schematic view illustrating an embodiment of a Power Supply Unit (PSU) mismatch detection system.

Referring now to FIG. 2, an embodiment of a Power Supply Unit (PSU) mismatch detection system provided in a computing device 200 is illustrated. In an embodiment, the computing device 200 may be the IHS 100 discussed above with reference to FIG. 1 and/or may include some or all of the components of the IHS 100. In specific embodiments discussed below, the computing device 200 is described as a server, although other computing devices such as desktop computing devices, laptop/notebook computing devices, tablet computing devices, mobile phones, networking devices (e.g., switches, router, etc.), storage systems, and/or other computing devices known in the art may benefit from the teachings of the present disclosure and thus will fall within its scope. In the illustrated embodiment, the computing device 200 includes a chassis 202 that houses the components of the computing device 200, only some of which are illustrated in FIG. 2. Furthermore, while the components of the computing device 200 are illustrated as housed in a single chassis, the computing device 200 may be distributed across multiple chassis while remaining within the scope of the present disclosure.

In the illustrated embodiment, the chassis 202 houses a power system 204 that includes a plurality of power supply unit (PSU) slots 206*a*, 206*b*, 206*c*, and 206*n*. Each of the plurality of PSU slots 206*a*-206*n* is configured to receive power from a power source (not illustrated), while being coupled to a main power rail 208 and an auxiliary power rail 210. Furthermore, each of the plurality of PSU slots 206*a*-206*n* is configured to couple to a respective power supply unit (PSU) 212*a*, 212*b*, and 212*n* that are configured to transmit power from the power source to the main power rail 208 and the auxiliary power rail 210. For example, in the illustrated embodiment, the PSU slot 206*a* is coupled with PSU 212*a*, the PSU slot 206*b* is coupled with PSU 212*b*, and the PSU slot 206*n* is coupled with PSU 212*n*, while the PUS slot 206*c* is not coupled with a PSU. While a specific example is shown of PSU slots coupled to respective PSUs, one skilled in the art will recognize that other configurations of the number of PSU slots coupled with PSUs may benefit from the present disclosure and thus fall within its scope. Furthermore, one skilled in the art will recognize that the power system 204 may include power connectors, power adapters, and/or other power system components known in the art.

The chassis 202 also houses a controller 214 that is coupled to the main power rail 208 and each of the plurality of PSU slots 206*a*-206*n*. In an embodiment, the controller may be coupled to the auxiliary power rail 210 and initially power off of the auxiliary power rail but switches over to the main power rail 208 once the main power rail 208 is activated. In an embodiment, the controller 214 may include a Baseboard Management Controller (BMC), an Integrated DELL Remote Access Controller (iDRAC), and/or other service processor known in the art. For example, the controller 214 may include a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the controller 214 to provide a PSU mismatch engine 216 that is configured to perform the functions of the PSU mismatch engine and controllers discussed below including, for example, the performance of the PSU mismatch algorithm that is discussed with regard to the method 300 below.

The chassis 202 also houses a programmable logic device 218 that is coupled to the main power rail 208, the auxiliary power rail 210, and the plurality of PSU slots 206*a*-206*n*. For example, the programmable logic device 218 may include a processing system (not illustrated) and a memory system (not illustrated) that includes instructions that, when executed by the processing system, cause the programmable logic device 218 to provide a PSU management engine 220 that is configured to perform the functions of the PSU management engines and programmable logic devices discussed below including, for example, the system power management for the PSU mismatch algorithm that is discussed with regard to the method 300 below. In an embodiment, the programmable logic device 218 may include programmable logic that is configured to cause the programmable logic device 218 to provide the PSU management engine 220. For example, the programmable logic device 218 may be a complex programmable logic device (CPLD). In an embodiment, the programmable logic device 218 may include a shared memory 222 that, as discussed below, may be shared between the programmable logic device 218 and the controller 214. As illustrated, the programmable logic device 218 includes the shared memory 222; however, the shared memory 222 may be separate from the programmable logic device 218 (e.g., provided by the controller 214, provided by a stand-alone memory device accessible by each of the programmable logic device 218 and the controller 214, etc.). While specific components of the computing device 200 have been illustrated and described, one of skill in the art in possession of the present disclosure will recognize that a variety of other components may be provided in the computing device 200 to perform conventional computing device functions based on the desired functionality of the computing device 200 while remaining within the scope of the present disclosure.

Figure 3:
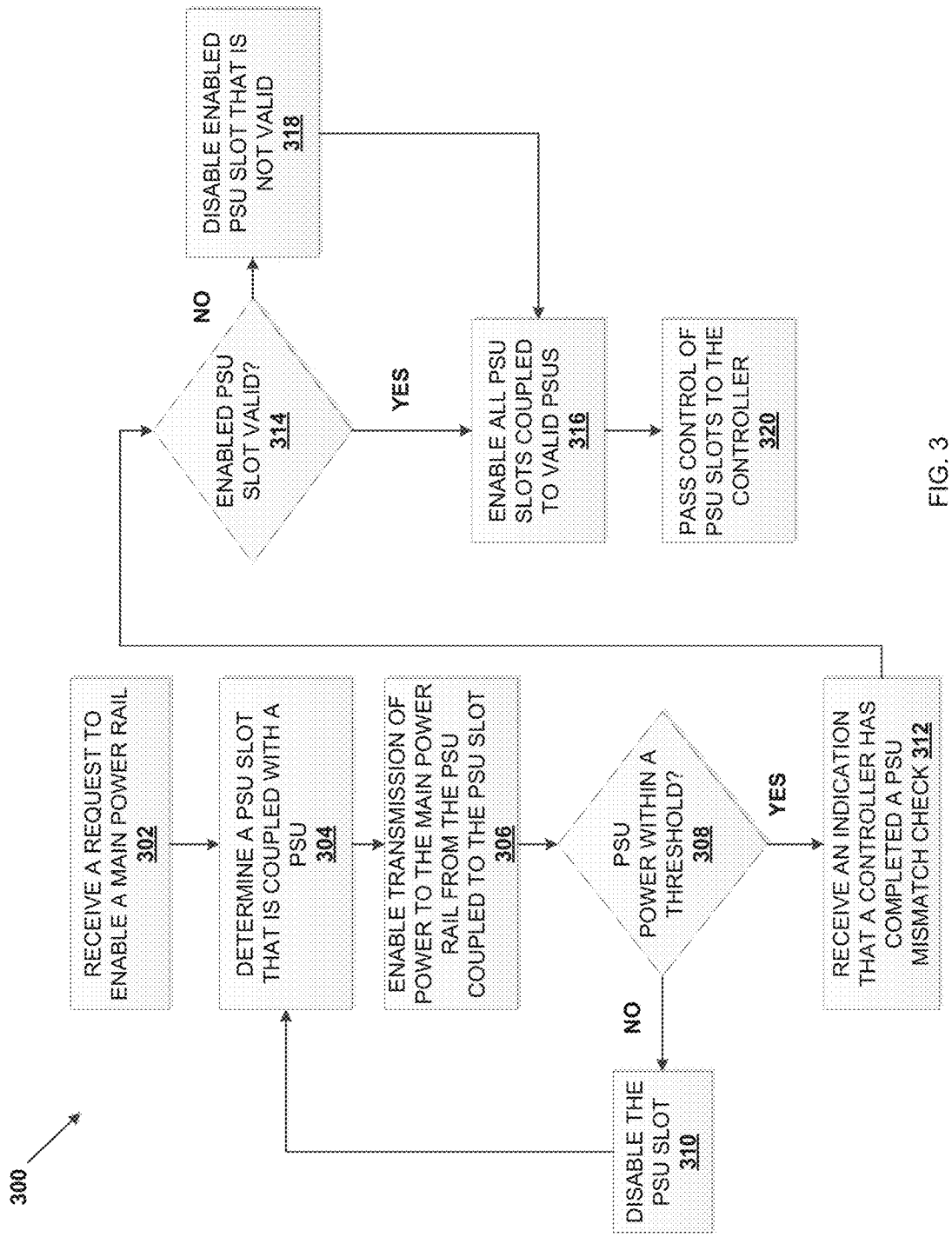
FIG. 3 is a flow diagram illustrating an embodiment of a method for providing PSU mismatch detection to the computing device of FIG. 2.

Referring now to FIG. 3, an embodiment of a method 300 of preventing PSU mismatch is illustrated. As discussed below, a programmable logic device coupled to an auxiliary power rail may manage a plurality of PSUs (e.g., coupled to PSU slots) that may provide power to the auxiliary power rail and a main power rail of a computing device when enabled. The programmable logic device may initially enable a single PSU before a controller has been booted and completed a PSU mismatch check to provide power to the main power rail, thus powering a controller that performs the PSU mismatch check for all of the PSUs coupled to the system. Upon completion of the PSU mismatch check, the controller may report to the programmable logic device all PSUs belonging to the valid PSU configuration on the system. If the PSU that is currently enabled to allow the controller to perform the PSU mismatch check is a PSU incompatible with the valid PSU configuration according to the PSU mismatch check, the programmable logic device may disable the PSU by removing power from the main power rail (while if that PSU is a PSU, power to the main power rail from that PSU may be maintained). The removal of power does not affect data loss because the system may be in power-on self-test. The programmable logic device may then enable all of the PSUs coupled to the system that belong to the valid PSU configuration according to the PSU mismatch check to provide power to the main power rail. The method 300 prevents PSUs that are mismatched and/or incompatible with each other or the system from being enabled to provide power to the main power rail at the same time, which may prevent errors, damage to the computing device, and other issues that result from mismatched power supplies. The systems and methods may also free the system from requiring auxiliary power rail circuitry for the controller that takes up valuable space in the computing device.

Referring to FIG. 3, the method 300 begins at block 302 where a request to enable power on a main power rail of a computing device is received. In an embodiment, at block 302 a request to enable power to the main power rail 208 of the computing device 200 is received by the programmable logic device 218. In an embodiment, the auxiliary power rail 210 may be enabled prior to receiving the request to enable the main power rail 208. Therefore, the programmable logic device 218 coupled to the auxiliary power rail 210 is enabled prior to receiving the request to enable the main power rail 208. As a specific example, the programmable logic device 218 is powered on, started, initialized, and/or otherwise enabled when the auxiliary power rail 210 of the computing device 200 is enabled. When the programmable logic device 218 is enabled, the programmable logic device 218 may initialize a PSU slot management bits in the shared memory 222 so that all values stored in the shared memory 222 are logically false.

FIG. 4 illustrates an example of a PSU slot management table 400 which represents the bits stored in the shared memory 222 (e.g., registers) and/or hardware signals received from PSUs with combinational logic of the programmable logic device 218. The PSU slot management table 400 may represent a power on request bit 402 that indicates to the programmable logic device 218 to enable power to the main power rail 208 when the power on request bit 402 is set to logically true. The PSU slot management table 400 may include a mismatch check complete bit 404, which when set to logically true indicates to the programmable logic device 218 when the PSU mismatch check has been completed by the controller 214. The PSU slot management table 400 may represent a bit for each PSU slot that indicates whether the PSU slot has input power. The presence of input power may indicate whether the PSU slot is coupled to a PSU. For example, row 406 labeled "PSU Slot AC OK" of the PSU management table 400 represents each bit that indicates whether PSU slot(1), PSU slot(2), PSU slot(3), and PSU slot(N) have input power (i.e., those slots may have input power when their respective bits are set to logically true.) The PSU slot management table 400 may also represent bits that will cause hardware logic of the programmable logic device 218 to enable, each PSU slot coupled to a PSU to provide power to the main power rail 208. For example, row 408 of the PSU management table 400 indicates whether the programmable logic device 218 has enabled PSU slot(1), PSU slot(2), PSU slot(3), and PSU slot(N) (e.g., if a bit is set to logically true in row 408, the respective PSU slot may be enabled to provide power to the main power rail 402.) The PSU slot management table 400 may also represent a hardware signal for each PSU slot that indicates whether the PSU slot output power meets a threshold. For example, a PSU with a 12V main power output could have a threshold of +/−8% which corresponds to a valid main power output range of 11.04V to 12.96V. The PSU can monitor its own main power output and asserts a logically true or false signal depending on whether the output power is within the valid main power output range. For example, row 410 of the PSU management table 400 indicates whether PSU slot(1), PSU slot(2), PSU slot(3), and PSU slot(N) have output power that meets the threshold (e.g., that output power meets the threshold when the respective bits are set to logically true.) The PSU slot management table 400 may also represent a bit for each PSU slot in which the controller 214 may store a logically true or false value to indicate whether a respective PSU slot is coupled with a PSU of a valid PSU configuration after the PSU mismatch check. For example, row 412 of the PSU management table 400 indicates whether the PSU slot(1), PSU slot(2), PSU slot(3), and PSU slot(N) is coupled to PSUs of a valid PSU configuration by storing a logically true bit (i.e., associated with a PSU of a valid PSU configuration) or false bit (i.e., associated with a PSU of an invalid PSU configuration) for each PSU slot.

After the PSU slot management table 400, which represents the bits in shared memory 222 and the hardware signals, has been initialized by the programmable logic device 218 to logically false values, the programmable logic device 218 may monitor the computing device 200 until the request to enable power to the main power rail 208 is received at block 302. For example, the programmable logic device 218 may monitor the power via the request bit 402 represented by the PSU management table 400 in the shared memory 222 until the power on request bit 402 is set to a logically true value indicating the request to enable power. For example, the controller 214 may set the power on request bit 402 to a logically true value if the controller 214 had previously booted on from auxiliary power. Otherwise, the programmable logic device 218 may monitor hardware signals such as a hardware signal from the front panel power button. In another example, a peripheral control hub (PCH) may be set to automatically request power on whenever power is available and assert a hardware signal to the programmable logic device 218, which may set the power on request bit 402 to a logically true value.

The method 300 then proceeds to block 304 where a PSU slot is determined to be coupled with a PSU. In an embodiment, at block 304 the programmable logic device 218 may determine that is PSU is coupled to a PSU slot of the plurality of PSU slots 206a-206n. In an embodiment, the programmable logic device 218 may sequentially check each PSU slot 206a-206n for a PSU until the programmable logic device 218 determines that a PSU Is coupled to at least one PSU slot. For example, the programmable logic device 218 may check PSU slot 206a, determine that the PSU 212a is coupled to the PSU slot 206a, and then select the PSU slot 206a to be enabled as described further below. If a PSU slot is not coupled to a PSU (e.g., the PSU slot 206c), then the programmable logic device 218 may proceed to check the next PSU slot until the programmable logic device 218 finds a PSU slot that is coupled with a PSU that can provide main power to the main power rail 208.

In an embodiment, at block 304 the programmable logic device 218 may determine whether a PSU slot of the plurality of PSU slots 206a-206n has input power enabled. For example, the programmable logic device 218 may check a bit in row 406 of the PSU management table 400 for PSU slot(1), which may correspond to PSU slot 206a, and if the programmable logic device 218 reads a logically true value, then the programmable logic device 218 may determine that the PSU slot 206a has input power and therefore that a PSU is coupled to the PSU slot 206a. If the programmable logic device 218 reads a logically false value in row 406 for PSU slot(1), the programmable logic device may increment a PSU slot count to PSU slot(2) (e.g., PSU slot 206b), check the bit stored in row 406 for PSU slot(2) for a logically true or false value, and so on until the programmable logic device 218 reads a logically true value that indicates a PSU is coupled to one of the plurality of PSU slots 206a-206n.

The method 300 then proceeds to block 306, where transmission of power is enabled to the main power rail from the PSU that was determined to be coupled to the PSU slot at block 304. In an embodiment, at block 306, in response to determining that the PSU slot 206a is coupled to the PSU 212a at block 306, the programmable logic device 218 then enables the transmission of power to the main power rail 208 from PSU 212a coupled to PSU slot 206a. For example, the programmable logic device 218 may set the bit in row 408 for PSU slot(1) of the PSU management table 400 to a logically true value, which has the effect of "turning on" PSU slot 206a to enable power from the PSU 212a to the main power rail 208.

The method 300 then proceeds to decision block 308, where it is determined whether the power provided to the main power rail meets a threshold. In an embodiment, at decision block 308, the programmable logic device 218 determines whether the power being transmitted to the main power rail 208 from PSU 212a coupled to PSU slot 206a meets a threshold. For example, a PSU with a 12V main power output could have a threshold of +/−8%, which corresponds to a valid main power output range of 11.04V to 12.96V. The PSU may monitor its own main power output and asserts a logically true or false signal depending on whether the output power is within the valid main power output range. The programmable logic device 218 may reference the PSU management table 400 at row 410 (e.g., receive hardware signals from the PSU) and determine whether the bit for the PSU slot(1) is set to a logically true or false value. If the bit for PSU slot(1) is set to logically false, then the programmable logic device 218 may determine that the PSU slot 206a output power to the main power rail 208 does not meet the threshold. If the bit for PSU slot 206 is set to logically true, then the programmable logic device 218 may determine that the PSU slot 206a output power to the main power rail 208 meets the threshold. If the programmable logic device 218 determines that the output power from the PSU 212a coupled to the PSU slot 206a does not meet the threshold, then method 300 proceeds to block 310 where power from the PSU 212a to the main power rail is disabled. In an embodiment, the programmable logic device 218 may disable power from the PSU 212a in the PSU slot 206a to the main power rail 208. For example, the programmable logic device 218 may reference the PSU management table 400 and set the bit for PSU slot(1) in row 408 to a logically false value, which may be a disabled state that prevents the PSU 212a from providing power to the main power rail 208 through the PSU slot 206a. The method 300 may then return to block 304 to determine a different PSU slot that is coupled with a PSU substantially as discussed above.

If at decision block 308, it is determined that PSU output power to the main power rail meets the threshold, then the method 300 proceeds to block 312 where an indication is received that a controller has completed a PSU mismatch check. In an embodiment in response to the transmission of power being enabled to the main power rail 208 at block 308 and/or the auxiliary power rail, the controller 214 may initialize and begin performing a variety of actions the controller 214 is programmed to perform including, for example, performing a PSU mismatch check using the PSU mismatch engine 216, monitoring temperature, monitor fan speeds, monitor communication parameters, and/or other controller based routines known in the art. For example, the PSU mismatch check may determine whether any issues will arise if a combination of PSUs 212a, 212b, and 212n installed on the computing device 200 provide power to the main power rail at the same time. Specifically, the PSU mismatch check may compare parameters between the PSUs and between the PSUs and the system. The controller may determine parameters of the PSUs and system and reference a table stored in memory and/or hard coded logic to know which combinations are valid. For example, the controller 214 may determine parameters for each PSU such as PSU models supported by the system, PSU output power capability, PSU generation, PSU output voltage, PSU hardware and firmware versions and other PSU and system parameters known in the art. The PSU mismatch check may prioritize certain features as well in determining a valid PSU configuration. For, example if a first PSU slot has an 1100 W PSU installed and a second PSU slot has a 495 W PSU installed, the PSU mismatch check may determine the combination of the PSUs enabled together could lead to an unexpected shut down of the system due to their power output difference. Each of them enabled alone would not result in any system issues. The PSU mismatch check may prioritize the higher capacity PSU and a valid PSU configuration would include the 1100 W PSU and not the 495 W PSU. In another example, the system may have multiple 495 W PSUs and one 1100 W PSUs. Because there are multiple 495 W PSUs, the PSU mismatch check may determine that the 495 W PSU is the preferred PSU and a valid PSU configuration would include all 495 W PSUs and not the 1110 W PSU.

Following the performance of the PSU mismatch check, the controller 214 may send an indication to the programmable logic device 218 that the PSU mismatch check has been completed, as well as the results of the PSU mismatch check. For example, after completing the PSU mismatch check, the controller 214 may reference the PSU management table 400 and write the mismatch check complete bit 404 to logically true in order to indicate to the programmable logic device 218 that the PSU mismatch check has been completed. The controller 214 may also reference row 412 of the PSU management table 400 and store the results of the PSU mismatch check in row 412 by setting bits for each PSU slot to logically true or false depending on whether the PSU in each of those PSU slots was found to belong to a valid PSU configuration (e.g., an indication that the PSU slot does not have a PSU, or that the PSU in that PSU slot results in a mismatch), respectively.

In an embodiment, from the time when the PSU is enabled to provide power to the main power rail to the time the programmable logic device 218 receives the indication that the PSU mismatch check has completed, the programmable logic device 218 may monitor the computing device 200 to determine whether the output power from the PSU enabled at block 304 still meets the threshold and, if not, return the method 300 to block 304. Furthermore, the programmable logic device 218 may also determine during that time whether the PSU mismatch check meets a timeout condition. For example, if the programmable logic device 218 does not receive the indication that the PSU mismatch check has completed after a period of time following the initial enablement of power to the main power rail, then the programmable logic device 218 will determine that the PSU mismatch has met the timeout condition and, in response, enable power from all of the PSU's 212a-212n in the PSU slots 206a-206n to the main power rail 208 in order to provide power to the controller 214. As such, if the PSU mismatch check complete bit 404 is not set after some period of time, the main power rail 208 may be enabled via each of the PSUs 212a-n in the system.

The method 300 then proceeds to decision block 314 where the enabled PSU slot is determined to be coupled to a PSU that belongs to a valid configuration of PSUs. In an embodiment, at block 314 the programmable logic device 218 may determine whether the PSU 212a coupled to PSU slot 206a belongs to a valid PSU configuration from the results of the PSU mismatch check performed by the controller 214. For example, the programmable logic device 218 may reference the PSU management table 400 at row 412 to determine whether the bit for PSU slot(1) is set to a logically true or false value indicating whether the PSU belongs to a valid PSU configuration or not. If at decision block 314 the programmable logic device 218 determines that the PSU 212a coupled to the PSU slot 206a belongs to a valid PSU configuration, then the method 300 proceeds to block 316, where all of the PSU slots coupled to PSUs belonging to the valid PSU configuration, as determined by the PSU mismatch check, are enabled. In an embodiment, at block 316 the programmable logic device 218 may determine all of the PSUs belonging to the valid PSU configuration from the results of the PSU mismatch check received in the indication from the controller 214. For example, the programmable logic device 218 may reference row 412 of the PSU management table 400 to determine which bit or bits have been set to logically true to indicate a PSU of the valid PSU configuration coupled with its respective PSU slot. In an specific example, the programmable logic device 218 may copy a bit mask of row 412 and write that bit mask to row 408 of the PSU management 400 table in order to enable power from the PSUs in the identified PSU slots to the main power rail 208.

If at decision block 314 the programmable logic device 218 determines that the PSU 212a coupled to the PSU slot 206a is not part of the valid PSU configuration, then the method 300 proceeds to block 318, where the PSU slot coupled to the PSU that is transmitting power to the main power rail is disabled. In an embodiment, at block 318, the programmable logic device 218 may disable the PSU slot 206a, thereby ending transmission of power from the PSU 212a to the main power rail 208. For example, the programmable logic device 218 may set the bit for PSU slot(1) at row 408 of the PSU management table 400 to a logically false value in order to disable power from the PSU 212a to the main power rail 208 through the PSU slot 206a. Following block 318, the method 300 then proceeds to block 316 where all of the PSU slots coupled to PSUs determined as being a part of the valid PSU configuration (as determined by the PSU mismatch check) are enabled. In an embodiment, following block 316, the programmable logic device 218 may delay proceeding to block 316 for a period of time in order to, for example, drain capacitance stored on the main power rail (e.g., 10 sec, 15 sec, or any amount of time necessary to drain capacitance from a main power rail). One of skill in the art in possession of the present disclosure will recognize that by disabling the that disabling PSU slot 206a when coupled to a PSU not belonging to a valid PSU configuration before enabling the PSU slots coupled to PSUs belonging to the valid PSU configuration, prevents incompatible/mismatched PSUs from ever being enabled at the same time.

The method 300 then proceeds to block 320, where control of the PSU slots is passed to the controller. In an embodiment, at block 320 the programmable logic device 218 may pass control of the PSU slots 206a-206n to the controller 214, and the controller 214 may continue to monitor the functionality of the PSU slots 206a-206n that were enabled at block 316 to determine whether or not the PSU slots 206a-206n are transmitting power from their respective PSUs to the main power rail 208 that meets the threshold. For example, the programmable logic device 218 may allow the controller 214 to edit any of the bits in the PSU management table 400 stored in the shared memory 222 as discussed above.

Thus, systems and methods have been described that provide for a PSU mismatch detection system that prevents mismatched/incompatible PSU from providing power to a main power rail at the same time. Such benefits are provided by providing initial control of PSUs/PSU slots to a programmable logic device that is separate from a controller that performs a PSU mismatch check and that is coupled to the auxiliary power rail. The programmable logic device may enable a single PSU to transmit power to the main power rail to power on the system while the controller performs the PSU mismatch check. If the PSU mismatch check determines that the enabled PSU is incompatible with a valid PSU configuration, then the programmable logic device may disable the enabled PSU providing power to the main power rail, and enable all PSUs belonging to the valid PSU configuration, thereby preventing any incompatible PSUs being enabled at the same time. The PSU mismatch detection system of the present disclosure may also allow for removal of auxiliary power rail circuitry for the controller, which frees up space for other control circuitry and/or provides for relatively smaller controllers and computing devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power supply unit (PSU) mismatch detection system, comprising:

a plurality of PSU slots, wherein each PSU slot is configured to couple to a PSU and transmit power from that PSU to an auxiliary power rail and a main power rail;

a controller that is coupled to the main power rail and each of the plurality of PSU slots, wherein the controller is configured to perform a PSU mismatch check on each PSU coupled to the plurality of PSU slots when the main power rail is enabled, and report results of the PSU mismatch check, and wherein the PSU mismatch check identifies whether the plurality of PSUs are compatible with each other based on parameters of the plurality of PSUs; and a programmable logic device that is coupled to the auxiliary power rail, the main power rail, and each of the plurality of PSU slots, wherein the programmable logic device is configured to:

receive a request to enable the main power rail while powered by the auxiliary power rail;

enable transmission of power to the main power rail from a first PSU coupled to a first PSU slot of the plurality of PSU slots;

determine that the power transmitted to the main power rail from the first PSU coupled to the first PSU slot is within a threshold;

receive an indication that the controller has completed the PSU mismatch check on each PSU coupled to the plurality of PSU slots, wherein the controller performs the PSU mismatch check using power transmitted to the main power rail through the first PSU slot by the first PSU;

determine one or more valid PSU slots from the plurality of PSU slots that are coupled to a PSU belonging to a valid PSU configuration using the results of the PSU mismatch check; and enable the transmission of power to the main power rail from the one or more PSUs belonging to a valid PSU configuration coupled to the one or more valid PSUs slots.

2. The system of claim 1, wherein the programmable logic device is further configured to:

determine that the power transmitted to the main power rail from the first PSU coupled to the first PSU slot is not within the system threshold and, in response, disable the first PSU slot;

enable the transmission of power to the main power rail from a second PSU coupled to a second PSU slot of the plurality of PSU slots; and determine that the power transmitted to the main power rail from the second PSU coupled to the second PSU slot is within the system threshold.

3. The system of claim 1, wherein the programmable logic device is further configured to:

determine that the results of the PSU mismatch check indicate that the first PSU slot is an invalid PSU slot coupled to a PSU incompatible with the valid PSU configuration and in response, disable the transmission of power to the main power rail from the first PSU coupled to the first PSU slot before enabling the transmission of power to the main power rail from the one or more PSUs belonging to the valid PSU configuration coupled to the one or more valid PSU slots.

4. The system of claim 3, wherein the programmable logic device is further configured to:

drain a power capacitance from the main power rail after disabling the transmission of power to the main power rail from the first PSU coupled to the first PSU slot but before enabling the transmission of power to the main power rail from the one or more PSUs belonging to the valid PSU configuration coupled to the one or more valid PSU slots.

5. The system of claim 1, wherein the programmable logic device is further configured to:

pass control of the plurality of PSU slots to the controller in response to enabling the transmission of power from the one or more PSUs belonging to the valid PSU configuration coupled to the one or more valid PSU slots.

6. The system of claim 1, wherein the programmable logic device is further configured to:

determine, following the enabling of the transmission of power to the main power rail from the first PSU coupled to the first PSU slot, that no indication has been received that indicates that the controller has completed the PSU mismatch check and, in response, enabling the transmission of power to the main power rail from the each PSU coupled to the plurality of PSU slots.

7. The system of claim 1, wherein the programmable logic device is further configured to:

monitor power transmitted to the main power rail from the first PSU coupled the first PSU slot while prior to receiving the indication that the controller has completed the PSU mismatch check;

determine that the power transmitted to the main power rail from the first PSU coupled to the first PSU slot is not within the system threshold and, in response, disable the transmission of power to the main power rail from the first PSU coupled to the first PSU slot; and enable the transmission of power to the main power rail from a second PSU coupled to a second PSU slot of the plurality of PSU slots.

8. An Information Handling System (IHS), comprising:

a chassis;

a processing system located in the chassis;

a memory system located in the chassis and coupled to the processing system; and a power system located in the chassis and coupled to each of the processing system and the memory system, wherein the power system includes:

a plurality of PSU slots, wherein each PSU slot is configured to couple to a PSU and transmit power from that PSU to an auxiliary power rail and a main power rail;

a controller that is coupled to the main power rail and each of the plurality of PSU slots, wherein the controller is configured to perform a PSU mismatch check on each PSU coupled to the plurality of PSU slots when the main power rail is enabled, and report results of the PSU mismatch check, wherein the PSU mismatch check identifies whether the plurality of PSUs are compatible with each other based on parameters of the plurality of PSUs; and a programmable logic device that is coupled to the auxiliary power rail, the main power rail, and each of the plurality of PSU slots, wherein the programmable logic device is configured to:

receive a request to enable the main power rail while powered by the auxiliary power rail;

enable transmission of power to the main power rail from a first PSU coupled to a first PSU slot of the plurality of PSU slots;

determine that the power transmitted to the main power rail from the first PSU coupled to the first PSU slot is within a threshold;

receive an indication that the controller has completed the PSU mismatch check on each PSU coupled to the plurality of PSU slots, wherein the controller performs the PSU mismatch check using power transmitted to the main power rail through the first PSU slot by the first PSU;

determine one or more valid PSU slots from the plurality of PSU slots that are coupled to a PSU belonging to a valid PSU configuration using the results of the PSU mismatch check; and enable the transmission of power to the main power rail from the one or more PSUs belonging to the valid PSU configuration coupled to the one or more valid PSUs slots.

9. The IHS of claim 8, wherein the programmable logic device is further configured to:

determine that power transmitted to the main power rail from the first PSU coupled to the first PSU slot is not within the system threshold and, in response, disable the first PSU slot;

enable the transmission of power to the main power rail from a second PSU coupled to a second PSU slot of the plurality of PSU slots; and determine that power transmitted to the main power rail from the second PSU coupled to the second PSU slot is within the system threshold.

10. The IHS of claim 8, wherein the programmable logic device is further configured to:

determine that the results of the PSU mismatch check indicate that the first PSU slot is an invalid PSU slot coupled to an PSU incompatible with the valid PSU configuration and in response, disable the transmission of power to the main power rail from the first PSU coupled to the first PSU slot before enabling the transmission of power to the main power rail from the one or more PSUs belonging to the valid PSU configuration coupled to the one or more valid PSU slots.

11. The IHS of claim 10, wherein the programmable logic device is further configured to:

drain a power capacitance from the main power rail after disabling the transmission of power to the main power rail from the first PSU coupled to the first PSU slot but before enabling the transmission of power to the main power rail from the one or more PSUs belonging to the valid PSU configuration coupled to the one or more valid PSU slots.

12. The IHS of claim 8, wherein the programmable logic device is further configured to:

pass control of the plurality of PSU slots to the controller in response to enabling the transmission of power from the one or more PSUs belonging to the valid PSU configuration coupled to the one or more valid PSU slots.

13. The IHS of claim 8, wherein the programmable logic device is further configured to: determine, following the enabling of the transmission of power to the main power rail from the first PSU coupled to the first PSU slot, that no indication has been received that indicates that the controller has completed the PSU mismatch check and, in response, enabling the transmission of power to the main power rail from the each PSU coupled to the plurality of PSU slots.

14. The IHS of claim 8, wherein the programmable logic device is further configured to:

monitor power transmitted to the main power rail from the first PSU coupled the first PSU slot while prior to receiving the indication that the controller has completed the PSU mismatch check;

determine that the power transmitted to the main power rail from the first PSU coupled to the first PSU slot is not within the system threshold and, in response, disable the transmission of power to the main power rail from the first PSU coupled to the first PSU slot; and enable the transmission of power to the main power rail from a second PSU coupled to a second PSU slot of the plurality of PSU slots.

15. A method for enabling power with Power Supply Unit (PSU) mismatch detection, comprising:

receiving, by a programmable logic device coupled to an auxiliary power rail and a plurality of PSU slots, a request to enable a main power rail while powered by the auxiliary power rail;

enabling, by the programmable logic device, transmission of power to the main power rail from a first PSU coupled to a first PSU slot of the plurality of PSU slots;

determining, by the programmable logic device, that the power transmitted to the main power rail from the first PSU coupled to the first PSU slot is within a threshold receive, by the programmable logic device, an indication that a controller that is coupled to the main power rail and each of the plurality of PSU slots has completed a PSU mismatch check on each PSU coupled to the plurality of PSU slots, wherein the controller performs the PSU mismatch check using power transmitted to the main power rail through the first PSU slot by the first PSU, and wherein the PSU mismatch check identifies whether the plurality of PSUs are compatible with each other based on parameters of the plurality of PSUs;

determining, by the programmable logic device, one or more valid PSU slots from the plurality of PSU slots that are coupled to a PSU belonging to a valid PSU configuration using results of the PSU mismatch check; and enabling, by the programmable logic device, the transmission of power to the main power rail from the one or more PSUs belonging to the valid PSU configuration coupled to the one or more valid PSUs slots.

16. The method of claim 15, further comprising:

determining, by the programmable logic device, that power transmitted to the main power rail from the first PSU coupled to the first PSU slot is not within the system threshold and, in response, disable the first PSU slot;

enabling, by the programmable logic device, the transmission of power to the main power rail from a second PSU coupled to a second PSU slot of the plurality of PSU slots; and determining, by the programmable logic device, that power transmitted to the main power rail from the second PSU coupled to the second PSU slot is within the system threshold.

17. The method of claim 15, further comprising determining, by the programmable logic device, that the results of the PSU mismatch check indicate that the first PSU slot is an invalid PSU slot coupled to an PSU incompatible with the valid PSU configuration and in response, disable the transmission of power to the main power rail from the first PSU coupled to the first PSU slot before enabling the transmission of power to the main power rail from the one or more PSUs belonging to the valid PSU configuration coupled to the one or more valid PSU slots.

18. The method of claim 17, further comprising draining, by the programmable logic device, a power capacitance from the main power rail after disabling the transmission of power to the main power rail from the first PSU coupled to the first PSU slot but before enabling the transmission of power to the main power rail from the one or more PSUs belonging to the valid PSU configuration coupled to the one or more valid PSU slots.

19. The method of claim 15, further comprising passing, by the programmable logic device, control of the plurality of PSU slots to the controller in response to enabling the transmission of power from the one or more PSUs belonging to the valid PSU configuration coupled to the one or more valid PSU slots.

20. The method of claim 15, further comprising determining, by the programmable logic device, following the enabling of the transmission of power to the main power rail from the first PSU coupled to the first PSU slot, that no indication has been received that indicates that the controller has completed the PSU mismatch check and, in response, enabling the transmission of power to the main power rail from the each PSU coupled to the plurality of PSU slots.

* * * * *